Feb. 25, 1969   H. A. ECKHARDT   3,429,435
SCREW CONVEYOR
Filed June 26, 1967   Sheet 1 of 3

INVENTOR.
HANS A. ECKHARDT

Feb. 25, 1969    H. A. ECKHARDT    3,429,435
SCREW CONVEYOR

Filed June 26, 1967    Sheet 2 of 3

INVENTOR.
HANS A. ECKHARDT

INVENTOR.
HANS A. ECKHARDT

United States Patent Office 3,429,435
Patented Feb. 25, 1969

3,429,435
SCREW CONVEYOR
Hans A. Eckhardt, 55 Crescent Bend,
Allendale, N.J. 07401
Filed June 26, 1967, Ser. No. 648,730
U.S. Cl. 209—39                              20 Claims
Int. Cl. B03c 7/06; B65g 33/14

ABSTRACT OF THE DISCLOSURE

A screw conveyor for feeding bulk materials containing hard, tough particles, and for removing and monitoring foreign particles therein. The feed material enters the bore of the screw housing through a 3-sided opening therein defined by an edge along which that bore is enlarged in essentially radial direction. The hopper section of the screw housing is provided with means for introducing and withdrawing gases, to fluidize, dry and heat the feed material. The hopper section is equipped with magnetic means to separate and retain magnetic particles. The magnetic means signal the presence of magnetic particles as well as of non-magnetic particles. Furthermore, electrically conductive members extending across the bottom of the hopper section monitor the accumulation of conductive particles.

---

The present invention relates to a screw conveyor for particulate materials, and more particularly to a screw conveyor for feeding tough, hard particles, and to a screw conveyor removing foreign particles from the feed material.

Screw conveyors are used in many industries for conveying particulate materials to and from apparatus for mixing, dispersing, homogenizing, kneading, compressing, devolatilizing, drying, separating, extruding or otherwise treating such materials. Frequently the conveying operation is combined in the screw conveyor with one or more of the aforementioned material treatments, such as is customary in extruders, blow molding machines, injection molding machines for plastic materials, especially for polymeric compositions. Nevertheless these machines constitute in their upstream portion screw conveyors, and since the subject of this improvement does not deal with material processing in machine portions further downstream, the term screw conveyor is applied herein for the above-mentioned and other machine types which constitute in their upstream portions a screw conveyor or screw feeder.

Conventionally a screw conveyor has a housing with a hopper section, a screw mounted rotatably in and extending through the bore of this housing, and in that hopper section a hopper throat of usually round, square or rectangular cross-section which intersects with that bore. Often the hopper throat is symmetric to the vertical plane through the center line of the housing's horizontal bore. Frequently all the walls of the hopper throat are vertical, and while the downstream and upstream end walls of the hopper throat approach the bore in radial planes of the bore, the right and left sides approach the bore either tangentially or intersecting under an angle which is usually only slightly less than 180°. In case of round or oblong hopper throats, a gradual transition from the 90°-intersection with the generatrix of the bore atop the bore axis to the tangential or close-to-tangential approach at the righ and left sidewalls takes place. In other constructions where the sidewalls of the hopper throat at the right and left sides converge downward and approach the bore either tangentially or, above that line, at an angle usually slightly less than 180°, principally the same conditions exist.

Aside from the above symmetric hopper throats, for a long time asymmetric or off-set hopper throats have been commercially available wherein at that side where the screw turns downward, the hopper throat approaches the bore either tangentially or with an angle of intersection which is usually only slightly less than 180°.

Often the tangential approach is carried further by undercutting the bore so that the material is carried around the screw in a gradually decreasing wedge-shaped groove of rectangular cross-section, the wall of which approaches the bore in radial directions and diminishes continuously, finally blending with the bore. Sometimes this wedge-shaped groove is extended to the opposite side of the bore where the screw flight rotates in upward direction. In any case the downstream and upstream walls of this undercut groove form with the bore an edge with an angle of 90° or larger. The opposite, leeward sidewall of the off-set hopper throat approaches the bore within the upper half of the bore. The upstream and downstream endwalls of the hopper throat usually constitute radial planes of the bore.

While the above off-set throats with a rectangular or square cross-section have been in use for several decades, round or oblong off-set throats have not become commercially available for several reasons. Their wedge-shaped groove has the cross-section of a circle segment which narrows continuously until it finally blends with the bore where the edges formed between the groove and the bore have flattened out and finally reached 180°.

The aforesaid hopper throats had been developed primarily for powdery and other fine granular materials and especially the off-set types for rubber, polyvinyl chloride and other plastics compositions which originally were fed to screw machines in the form of cold or hot strips. With the advent of later polymers such as the polyamides, the polyethylenes, especially of higher molecular weight, the polyacetals, the polycarbonates and many others, which have been commercially available as hard, tough pellets of about ⅛ inch size, severe problems were encountered when processing them on screw machines with such hopper throats.

On the hopper throats described above, the downstream endwall and the screw bore form an edge which is approached at a relatively narrow angle by the leading edge of the screw flight passing underneath. The hard, tough pellets of the feed material are constantly getting in the wedge-shaped area between these two edges, and during the operation of the screw conveyor they are wedged between these two edges. Since each of these two edges includes an angle of 90° or wider, the pellets are not forced out of the wedge-shaped space. As a result either the screw jams thus interrupting the operation of the screw conveyor, or the hard tough pellets break off larger or smaller pieces from the screw flights and from the hopper section contaminating the production, often rendering the processed product unusable, disordering and even damaging subsequent equipment such as extrusion dies, molds, valves, spinnerettes, calender rolls.

Beginning at the point where the screw flight turns upward into the hopper throat, as is the case with symmetric hopper throats and those off-set throat types where the leeward side of the throat starts at the upward-turning side of the screw, the pellets are wedged severely and crushed by the screw flight against the downstream wall of the hopper throat, since their own weight and that of the material above them hinders them to escape the wedging action. This hazard continues over the top of the bore and down the other side.

On most hopper throats, including the off-set throats, an additional wedging hazard occurs which becomes obvious when visualizing the operation in a radial plane. Pellets are wedged between the screw flight's land rotating downward and that sidewall of the hopper throat which approaches the bore at the same side tangentially or forms with the bore an edge of somewhat less than 180°. On those off-set throats which have an undercutting, gradually decreasing groove of rectangular cross-section, this tangential wedging is merely shifted to a line positioned further in the direction of screw rotation, while at the same time increasing the wedging hazard over the extended edge formed by the front endwall of the throat and the bore, with all the serious consequences outlined above.

It is known that even if no hard or tough pellets, granules or chips which for simplicity are referred to in this description as pellets, are to be processed and the material consists of much smaller particles of lower hardness or toughness, metal particles are abraded and eroded out of the screw flights and the entrance of the bore. Such small metal particles cause a highly undesirable color development in transparent polymeric materials, while on opaque compositions they cause a deviation from the required color shade that has to be matched. While the amount of abraded metal could be decreased by using special, expensive alloys with increased abrasion resistance, an elimination of the above mentioned hazards has not been achieved even with the most suitable construction materials.

Even those screw conveyors which are used for processing bulk materials of small particle size and low hardness and toughness, are exposed to jamming, when foreign hard, tough particles, such as nuts, bolts or other metallic or non-metallic particles get accidentially into the hopper and are squeezed in the above described wedge-shaped spaces between screw flight and hopper throat wall. In case the screw succeeds in crushing such foreign particles, severe damage to the screw flights and the hopper throat and also on machine parts further downstream occurs, mostly connected with unacceptable contamination of the product.

Many attempts have been made to resolve these problems, but none of them had decisive success. One method suggested is to bevel or round the edge along the intersection of hopper throat and bore; it is obvious that the wedging hazards were not eliminated, but in most cases even increased. Another method proposed a larger clearance between the screw flight lands and the bore diameter. This proposal still leads to jamming and damage, since in most cases a clearance larger than the largest material or foreign particle is impractical, and a somewhat smaller clearance did not eliminate the described dangers, but creates even additional wedging hazards downstream of the hopper throat.

In other attempts recesses and openings in the bore located downstream of the downstream hopper throat wall are provided; for obvious reasons they could not eliminate or even decrease the described hazards which occur at the downstream endwall and the sidewalls of the hopper throat. Furthermore they were concerned with tramp metal only and could not be expected to eliminate the hazards caused by the hard, tough particles of the feed material.

To remove foreign particles, such as tramp metal, from the feed material, it has been proposed to sift the feed material through a screen or perforated plate before it enters the hopper throat. This method is applicable only for well-flowing materials, but not for sticky, tacky materials. Furthermore only such foreign particles can be screened out which are larger than the largest particle expected in the feed material. The hazards caused by the hard, tough pellets of the feed material are not even decreased.

Another method sugggests the use of a grate magnet above the feed throat. However, the chemical and other industries use to a great extent stainless steels, aluminum and other non-magnetic metals in their plants. Such bolts, nuts, etc. from upstream equipment are not retained by the grate magnet. Furthermore, with many materials magnetized bars obstruct the flow of material excessively and therefore, cannot be used.

Accordingly, it is an object of this invention to provide a new and improved screw conveyor which eliminates the jamming of tough hard material particles.

A further object of the invention is to provide a new and improved screw conveyor for automatically removing tramp metal and other foreign particles.

Generally speaking, the present invention contemplates an improvement in a screw conveyor having a housing with a hopper section, a screw mounted rotatably in and extending through the bore of that housing, and a hopper port in the hopper section. According to the inventive concept, there is provided a three-sided opening in the interior cylindrical surface of that bore within the hopper section open toward the hopper port, defined by three edges; there is provided an enlargement of the bore over the area of the three-sided opening within the hopper section, in radial direction by an increment larger than the size of the largest particle to be processed; the three-sided opening is defined by an edge including an angle of less than 90° over at least part of its length.

These and other objects and features of the invention will become apparent by reference to the following detailed specification and drawings wherein.

Figure 1:
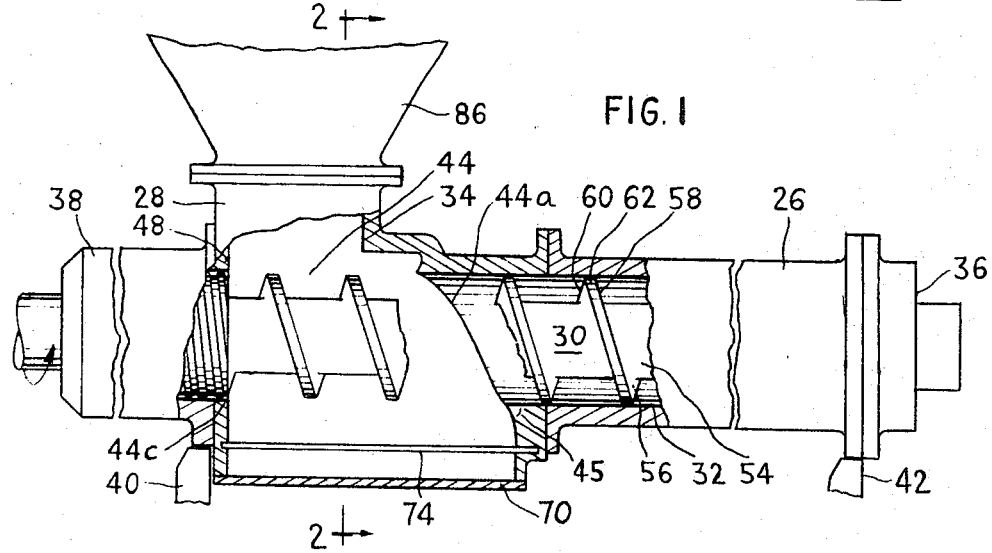
FIGURE 1 is an elevation of one embodiment of the invention, with parts broken away.
Figure 3:
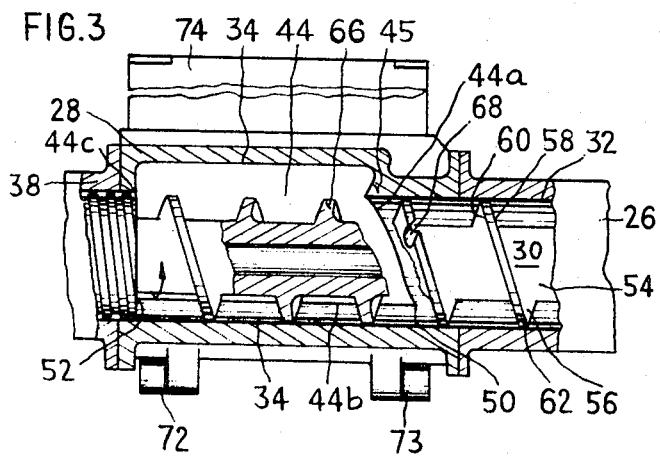
FIGURE 3 shows a cross-sectional view along the lines 3—3 of FIGURE 2.
Figure 2:
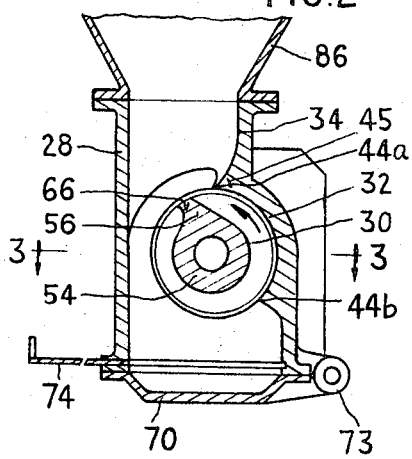
FIGURE 2 shows a cross-sectional view along the lines 2—2 of FIGURE 1.
Figure 4:
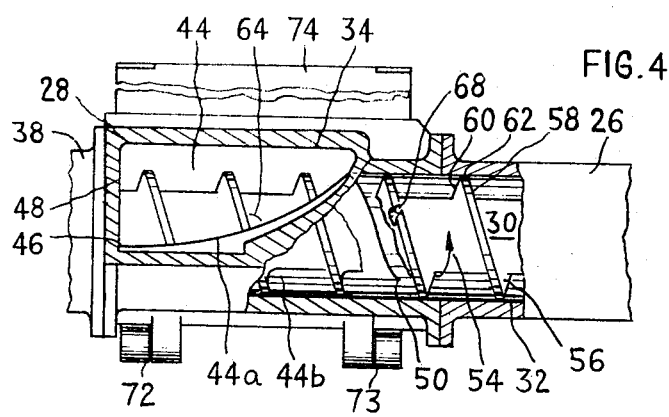
Figure 5:
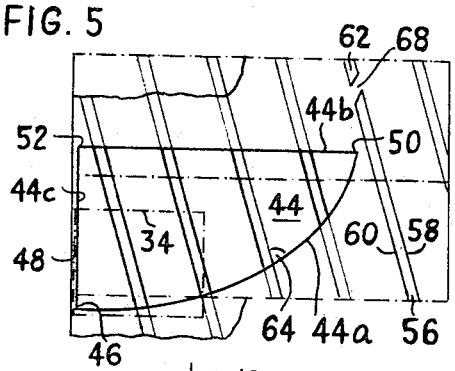
Figure 6:
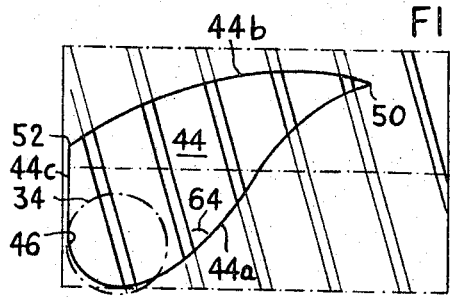
Figure 9:
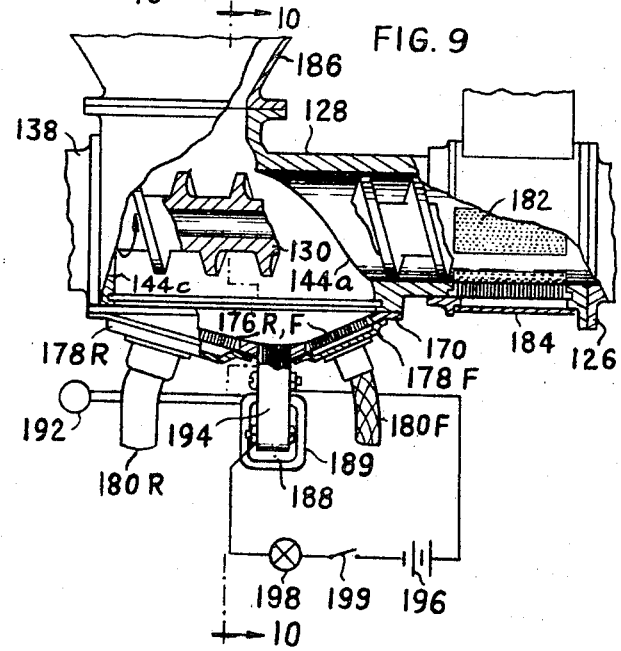
Figure 10:
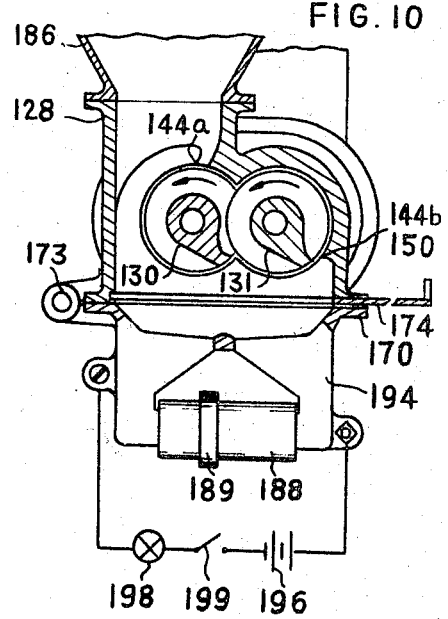
Figure 11:
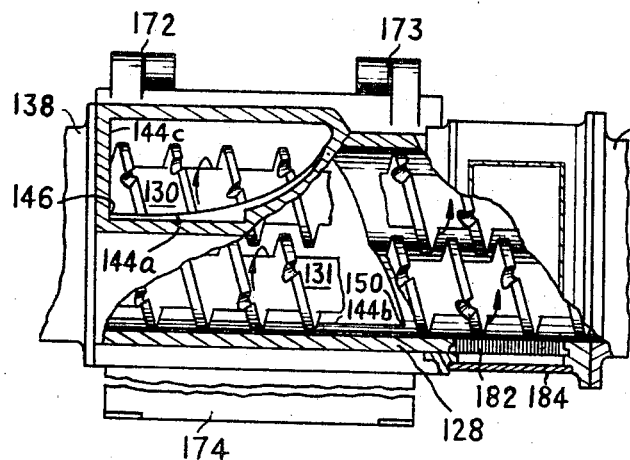
Figure 7:
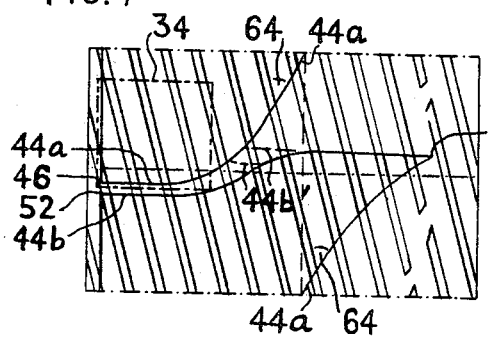
Figure 8:
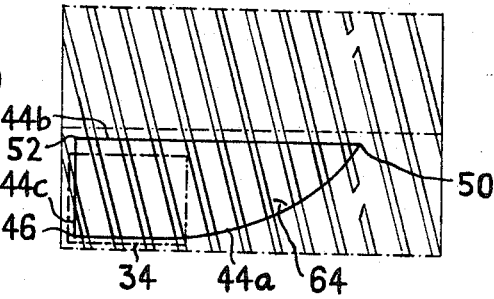
Figure 12:
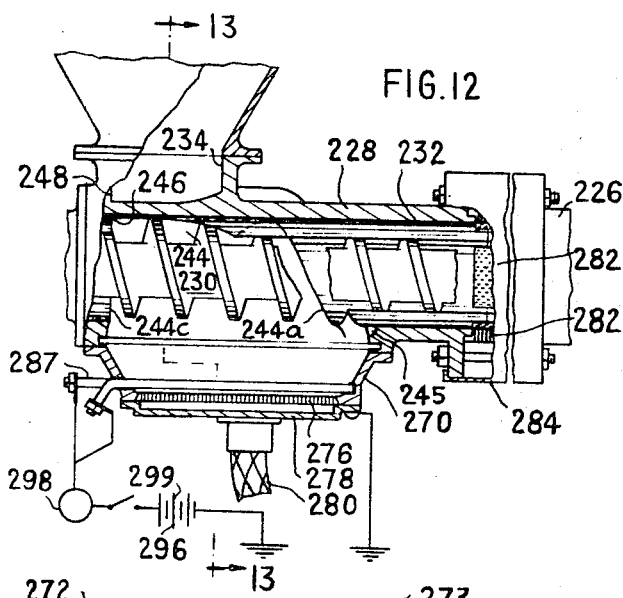
Figure 13:
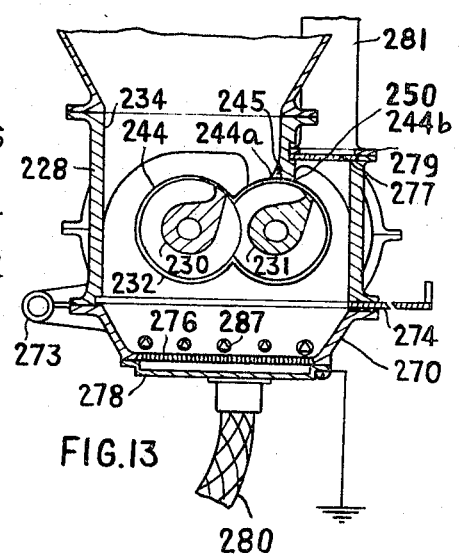
Figure 14:
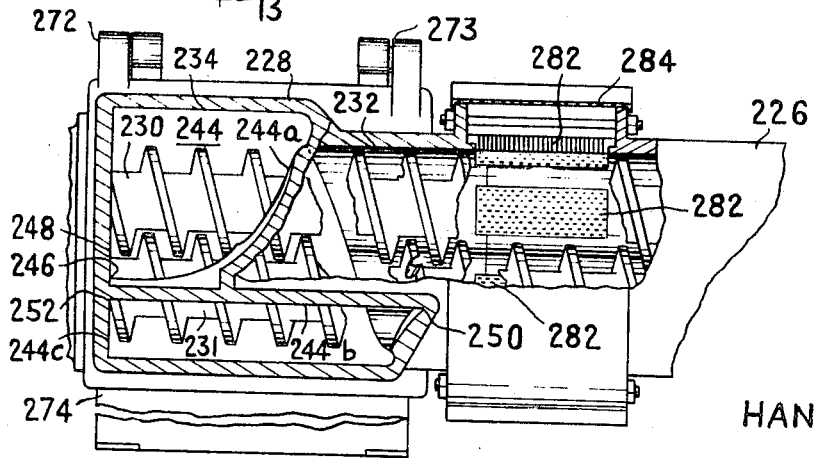

FIGURE 4 presents a plan view of the embodiment of FIGURE 1, with parts broken away;

FIGURE 5 is a plane development of the embodiment of FIGURE 1;

FIGURE 6 is a plane development of another embodiment;

FIGURE 7 is a plane development of still another embodiment;

FIGURE 8 is a plane development of a further embodiment;

FIGURE 9 is an elevation of another embodiment of the invention with parts broken away;

FIGURE 10 shows a cross-sectional view along the lines 10—10 of FIGURE 9;

FIGURE 11 presents a plan view of the embodiment of FIGURE 9 with parts broken away;

FIGURE 12 is an elevation of a further embodiment of the invention with parts broken away;

FIGURE 13 shows a cross-sectional view along the lines 13—13 of FIGURE 12;

FIGURE 14 presents a plan view of the embodiment of FIGURE 12 with parts broken away.

Referring now to the drawings, FIGURES 1, 2, 3, 4, there is shown a screw conveyor having a housing 26 with a hopper section 28, a screw 30 mounted rotatably in and extending through a bore 32 of the housing 26, and a hopper port 34 in the hopper section 28. To the downstream end of the housing 26 is flanged the extrusion die 36, while to the upstream end of housing 26 is connected the rear housing 38. The housings 26 and 38 rest on the supports 40 and 42 of the screw conveyor frame (not shown).

A three-sided opening 44 in the interior cylindrical surface of the bore 32 within the hopper section 28, open toward the hopper port 34, is defined by an edge 44a starting from an upstream start point 46 at the upstream sidewall 48 of the hopper port 34, and curving in a spiral between the direction in which the screw 30 rotates and the downstream direction to the downstream end point 50, an edge 44b extending from the downstream end point 50 to an upstream end point 52 located in the same radial plane as the upstream sidewall 48 of the hopper port 34, and an edge 44c extending from the upstream end point 52 in the direction opposite to the rotation of the screw 30 to the upstream start point 46.

The bore 32 is enlarged over the area of the three-sided opening 44 within the hopper section 28 in radial direction by an increment larger than the size of the largest particle to be processed. The edge 44a, b, c defining the three-sided opening includes an angle 45 of less than 90° over at least part of its length.

As shown in the embodiment of FIGURES 1 through 5, the edge 44a starts from the upstream start point 46 located at the upstream sidewall 48 of the hopper port 34 and above the axis of the screw 30 and curves in a spiral generally downward in a direction between the direction of screw rotation and the downstream direction, under the axis of the screw 30 and upward to the downstream end point 50.

The screw 30 comprises a root 54 and a helical flight 56 which comprises a leading edge 58, a trailing edge 60 and a land 62 therebetween. The angle 64 between the leading edge 58 and the edge 44a has its maximum above the axis of the screw 30 and decreases along its downward curve toward the side of the screw 30.

The angle 66 between the surface of the leading edge 58 and the surface of the land 62 is less than 90°, within the length of the screw 30 between the upstream start point 46 and the downstream end point 50. The helical flight 56 is provided with a groove 68 between the trailing edge 60 and the leading edge 58 such that the opening in the trailing edge 60 is larger than the opening in the leading edge 58. The groove 68 is located in the same radial plane as the downstream end point 50. A larger number of grooves is provided especially when the screw 30 is axially moveable. The decrease in the conveying efficiency of the screw 30 can be compensated by providing a correspondingly changed pitch on the screw 30.

The lower portion 70 of the hopper section 28 is recessed so as to form an accumulating space for processed material and is mounted by a hinged connection 72, 73 for quick detachment and fast removal of processed material. Above the hinged lower portion 70 of the hopper section 28, there is provided a slide valve 74 which permits in its closed position the fast removal of processed particles without interrupting the material conveyance.

FIGURES 6, 7 and 8 illustrate other embodiments of the invention. In FIGURE 6 the hopper port 34 is shown in its round projection. From the upstream start point 46 the edge 44a follows first the contour of the hopper port 34 and then curves downward with the angle 64 decreasing. Along the upward curve of the edge 44a, the angle 64 increases again to the downstream end point 50 from where the edge 44b curves back to the upstream end point 52 connected with the upstream start point 46 by the edge 44c. It is obvious that the edge 44c may be reduced to zero thus arriving at an opening 44 with a symmetrical or asymmetrical oblong, oval, diamond, spindle or otherwise shaped opening 44, without departing from the spirit of this disclosure. The three-sided opening 44 is preferable since in contrast to other shapes it offers the largest space for filling the screw and removing and accumulating foreign particles, and is less expensive to manufacture.

In FIGURE 7 the projection of the hopper port 34 is rectangular. From the upstream start point 46 the edge 44a curves over the top of the screw 30 and downward with the angle 64 decreasing, under the screw axis and upward with the angle 64 increasing again to the downstream end point 50 which is located further in the direction of screw rotation than the upstream start point 46. From there the edge 44b curves upstream to the upstream end point 52. The area shown below edge 44b is provided for a transparent cover so as to observe the flow of material. If that is not required, the edge 44b may be curved as outlined by the dotted lines 44b' and intersect the edge 44a, without departing from the spirit of this disclosure.

In FIGURE 8 the edge 44a starting at the upstream start point 46, first follows parallel to the leeward sidewall of the hopper port 34 and then curves downward, with the angle 64 decreasing to the downstream end point 50 from where the edge 44b goes back in a straight line to the upstream end point 52 which is connected with the upstream start point 46 by the edge 44c.

FIGURES 9, 10, 11 show an embodiment with two parallel, adjacent screws 130, 131 which rotate in the same direction in the housing 126, the hopper section 128, and the rear housing 138. From the upstream start point 146 the edge 144a curves downward and under the left screw 130 and right screw 131 to the downstream end point 150 from where the edge 144b runs to the upstream end point 152 connected to the upstream start point 146 by edge 144c.

The lower portion 170 of the hopper section 128 is recessed so as to form an accumulating space for processed material and is mounted by a hinged connection 172, 173 for quick detachment and fast removal of processed material. A slide valve 174 is provided above the hinged lower portion 170 permitting in its closed position the fast removal of processed particles without interrupting the material conveyance.

The hopper section 128 is provided with means for introducing gases into the material conveyed therein, consisting of the porous plates 176 F and R, and the covers 178 F and R. Therebetween air or other gases, either cold or heated, are introduced through the hoses 180 F and R; they seep through the porous plates 176 F and R and between the material particles either to withdrawal means above the hopper section 128 in the hopper 186, or to means for withdrawing gases from the conveyed material provided in the housing 126 and, more specifically, in the hopper section 128 thereof. These means comprise the porous inserts 182 and the cover 184; the space therebetween is either open to atmosphere or is connected to a vacuum pump (not shown).

The introduced gas serves to improve the flow properties of the material, to fluidize the material, to increase the mobility of the material particles, to improve the gravity separation of heavier foreign particles, to heat, dry, cool or otherwise treat the material. These operations are essentially improved as compared with commercial equipment where hot air is introduced above the hopper section 128 in the lower part of the hopper 186, and withdrawn at the top of that hopper 186. The gas withdrawal downstream of the hinged lower portion 170 improves the filling of the screw 130, and permits to control the bulk density of the material and the uniformity thereof.

To separate and retain magnetic particles, the hopper section 128 is provided with magnetic means which include a primary winding 188 which induces into a secondary winding 189 a voltage changed by foreign particles changing the magnetic field, the change in voltage being used by voltage measuring means 192 for indicating and signaling the accumulation of such foreign particles.

The magnetic means include a laminated core 194 which forms part of the surface of the lower portion 170 of the hopper section 128 being in contact with the conveyed material, the laminated core 194 having the even numbers of insulated metallic layers electrically connected with each other, with the hopper section 128 and with one pole of an electric energy source 196, of which the other pole is connected with the odd numbers of the insulated metal layers of the laminated core 194 via a switch 199 and current indicating means 198 which signal the presence of electrically conductive particles bridging the distance between any of the even and any of the odd metal layers.

FIGURES 12, 13, 14 illustrate an embodiment having a housing 226 with a hopper section 228 and a hopper port 234 therein. Two parallel adjacent screws 230, 231 are mounted rotatably in and extending through a bore 232 having the form of two intersecting hollow cylinders.

Besides means for rotating the screws 230, 231 there may be means provided for moving the screws 230, 231 in axial direction.

A three-sided opening 244 in the interior surface of the bore 232 within the hopper section 228 open to the hopper port 234 is defined by an edge 244a starting from the upstream start point 246 at the upstream sidewall 248 of the hopper port 234 above the axis of the right screw 231 and curving in a spiral, over the top of the left screw 230, downward under the axes of the screws 230, 231 and upward again to the downstream end point 250, an edge 244b extending from the downstream end point 250 to the upstream end point 252 located in the same radial plane as the upstream sidewall 248 of the hopper port 234, an edge 244c extending from the upstream end point 252 to the upstream start point 246.

Over the area of the three-sided opening 244, within the hopper section 228, the bore 232 is enlarged in radial direction by an increment larger than the largest particle to be processed. The edge 244a, b, c includes an angle 245 of less than 90° over the length of the edge 244a and b.

The lower portion 270 of the hopper section 228 is recessed so as to form an accumulating space for processed material, and is mounted by a hinged connection 272, 273 for quick detachment and fast removal of processed particles. Above the hinged lower portion 270 is provided a slide valve 274 permitting in its closed position the fast removal of processed particles without interrupting the material conveyance.

The lower portion 270 of the hopper section 228 is provided with means for introducing gases into the material conveyed therein, consisting of the porous metal plate 276, the cover 278 and the conduit 280.

The hopper section 228 is provided with a transparent cover 277 held by a flange 279, to observe the flow of material, and with a duct 281 for withdrawing gases. The housing 226 is also provided with means for withdrawing gases, consisting of the porous inserts 282, the cover 284, and a duct (not shown).

The electrically conductive members 287 extend across the lower portion 270 of the hopper section 228 from which their ends mounted therein are electrically insulated. The members 287 are connected to one pole of an electric energy source 296, the other pole of which is connected to the hopper section 228 via a switch 299 and current indicating means 298 which signal the presence of electrically conductive particles bridging the space between any of the members 287 and the porous metal plate 276. Should the porous plate 276 for any reason not be available in metal or in another conductive material, then the even numbers of the members 287 would be connected to one pole of the electric energy source 296, the other pole of which would be connected to the odd numbers of the members 287, via the switch 299 and the current indicating means 298 signaling the presence of electrically conductive particles bridging the distance between any of the even ones and any of the odd numbers of the members 287.

The above described sensing means have their parts connected to the hopper section 228. However, the hopper section 228 may carry only one part, and the screws 230, 231 another part of sensing means selected from those based on principles of magnetism, electricity and radiation, to detect foreign particles in the hopper section.

In the various embodiments, several surfaces are shown as sealing against gases as well as against the feed material. The seals however are not shown for better clarity. Also not shown, for the same reason, are bolts, screws and nuts to connect parts shown as being provided with flanges for such connections.

In the illustrated embodiments, screw conveyors with one or two parallel continuous screws are described, while it is understood that the same principle can be applied to conveyors with more than two screws, and to conveyors with interrupted flight screws or paddle rotors. It is further understood that the bore and screw axes are not necessarily horizontal, as shown in the various embodiments, but may be inclined from the horizontal plane. While the embodiments show two screws side by side parallel, it is understood that one screw may be disposed above another screw, or disposed in relation to the next adjacent screw under any angle. It is further understood that one or more screws may have a conical peripheral surface instead of the cylindrical peripheral surfaces shown in the various embodiments. It is understood that this disclosure also applies to screw machines with either the screws or the housing axially movable, in either a reciprocating or an oscillating movement.

In the embodiment of FIGURES 9, 10 the voltage measuring means 192 are shown only schematically, and it is understood that any suitable arrangement utilizing the change in the induced voltage for indicating and signaling the presence of foreign particles may be used. For example, the voltage measuring means 192 may include a reference or comparison unit (not shown) comprising a primary winding identical to and in series with the primary winding 188, a secondary winding identical to and in opposed series with the secondary winding 189, and a laminated core identical to the laminated core 194. If before the start-up of the operation the voltage in the secondary circuit is adjusted to zero, during the operation foreign particles accumulating at the bottom of the hopper section 128 will cause the loss of equilibrium in this secondary circuit and the induced differential voltage is then used for indicating and signaling the accumulation of such foreign particles.

It is also to be understood that while the electrical connections of the laminated core 194 as described before are preferred, instead of the even numbers, the odd numbers of the insulated metal layers of the laminated core 194 may be connected with the hopper section 128.

In the embodiment of FIGURES 12, 13, 14, the members 287 are spaced from the porous metal plate 276. It is to be understood that the members 287 may be inserted in and insulated from the porous metal plate 276. Should the porous plate 276 be non-metallic, non-conductive, then the even numbers of the inserted members 287 would be electrically connected with the hopper section 228 to one pole of the electric energy source 296, the other pole of which to the odd numbers of the members 287.

Although the present invention has been described in conjunction with various embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. In a screw conveyor having a housing with a hopper section, a screw mounted rotatably in and extending through the bore of said housing, a hopper port in said hopper section, the improvement therein comprising:
 (A) a three-sided opening in the interior cylindrical surface of said bore within the hopper section open toward said hopper port, defined by:
  (a) an edge starting from a point, the upstream start point, at the upstream sidewall of said hopper port, and curving in a spiral between the direction in which said screw rotates and the downstream direction to the downstream end point,
  (b) an edge extending from said downstream end point to a point, the upstream end point, located in the same radial plane as said upstream sidewall of said hopper port,
  (c) an edge extending from said upstream end point in the direction opposite to the screw rotation to said upstream start point,
 (B) an enlargement of said bore over the area of said three-sided opening within the hopper section, in radial direction by an increment larger than the size of the largest particle to be processed, (C) the edge defining said three-sided opening including an angle of less than 90° over at least part of its length.

2. A screw conveyor according to claim 1 wherein the edge (a) starting from the upstream start point located at the upstream sidewall of said hopper port and above the screw axis, curves in a spiral, generally downward in a direction between the direction of screw rotation and the downstream direction, under the screw axis and beyond upward to the downstream end point.

3. A screw conveyor according to claim 1 wherein the screw comprises:
  a root;
  a helical flight on said root;
  the helical flight comprising a leading edge, a trailing edge and a land therebetween;
the angle between said leading edge and said edge (a) having its maximum above the screw axis and decreasing along its downward curve toward the side of the screw.

4. A screw conveyor according to claim 1 wherein the screw comprises:
  a root;
  a helical flight on said root;
  the helical flight comprising a leading edge, a trailing edge and a land therebetween;
the angle between the leading edge surface and the land surface being less than 90°, within the screw length between the upstream start point and the downstream end point.

5. A screw conveyor according to claim 1 wherein the screw comprises:
  a root;
  a helical flight on said root;
  the helical flight comprising a leading edge, a trailing edge and a land therebetween;
the helical flight being provided with a groove between the trailing edge and the leading edge such that the opening in the trailing edge is larger than the opening in the leading edge.

6. A screw conveyor according to claim 1 wherein the lower portion of the hopper section is recessed so as to form an accumulating space for processed material.

7. A screw conveyor according to claim 1 wherein the hopper section's lower portion is mounted by a hinged connection for quick detachment and fast removal of processed material.

8. A screw conveyor as claimed in claim 7 wherein a slide valve is provided above the hinged lower portion of said hopper section, said slide valve permitting in its closed position the fast removal of processed particles without interrupting the material conveyance.

9. A screw conveyor according to claim 1 wherein said hopper section is provided with means for introducing gases into the material conveyed therein.

10. A screw conveyor according to claim 1 wherein said hopper section is provided with means for withdrawing gases from the material conveyed therein.

11. A screw conveyor according to claim 1 wherein said hopper section is provided with a transparent cover so as to observe the flow of material.

12. A screw conveyor according to claim 1 wherein said housing is provided with means for withdrawing gases.

13. A screw conveyor according to claim 1 wherein said hopper section is provided with magnetic means to pull and retain magnetic particles in said hopper section.

14. A screw conveyor according to claim 13 wherein the magnetic means include a primary winding which induces into a secondary winding a voltage changed by foreign particles changing the magnetic field, the change in voltage being used for indicating and signaling the accumulation of such foreign particles.

15. A screw conveyor according to claim 13 wherein the magnetic means include a laminated core which forms part of the surface of said hopper section being in contact with the conveyed material, the laminated core having the even numbers of insulated metal layers electrically connected with each other, with the hopper section, and with one pole of an electric energy source, of which the other pole is connected via current indicating means with the odd numbers of said insulated metal layers.

16. A screw conveyor according to claim 1 wherein electrically conductive members extend across the lower portion of said hopper section from which their ends mounted therein are electrically insulated, said members being connected to one pole of an electric energy source, the other pole of which being connected to said hopper section via current indicating means which signal the presence of electrically conductive particles bridging the space between any of said members and the bottom of said hopper section.

17. A screw conveyor according to claim 1 wherein the hopper section carries one part, and the screw another part of sensing means selected from those based on principles of magnetism, electricity, and radiation, to detect foreign particles in the hopper section.

18. A screw conveyor according to claim 1 wherein means are provided for moving the screw in axial direction.

19. A screw conveyor according to claim 1 wherein two screws parallel and adjacent to each other are mounted rotatably in and extending through a bore having the form of two intersecting hollow cylinders.

20. A screw conveyor having a housing with a hopper section, a screw mounted rotatably in and extending through the bore of said housing, a hopper port in said hopper section, the improvement therein comprising:
  a lower portion of said hopper section being recessed so as to form an accumulating space for processed material;
  said lower portion being mounted by a hinged connection to said hopper section for quick detachment;
  a slide valve provided above said lower portion, permitting in its closed position the detachment of said lower portion without interrupting the material conveyance;
  means for introducing gases, including a permeable, porous, electrically conductive plate at the bottom of said lower portion;
  electrically conductive members extending above said porous plate across said lower portion from which their ends mounted therein are electrically insulated, said members being connected to one pole of an electric energy source, of which the other pole is connected to said hopper section via current indicating means which signal the presence of electrically conductive particles bridging the distance between said members and said porous plate.

References Cited
UNITED STATES PATENTS

| | | |
|---|---|---|
| 2,290,930 | 7/1942 | Wurzbach. |
| 2,455,750 | 12/1948 | Freed. |
| 3,033,369 | 5/1962 | Kragle. |

FOREIGN PATENTS

| | | |
|---|---|---|
| 160,499 | 1/1955 | Australia. |

TIM R. MILES, *Primary Examiner.*

U.S. Cl. X.R.

198—213, 232; 209—138, 147, 223, 225; 222—413; 324—41